United States Patent [19]
Li et al.

[11] Patent Number: 5,553,218
[45] Date of Patent: Sep. 3, 1996

[54] GRAPHICAL USER INTERFACE FOR RELATING KEY INDEX PROPERTIES TO DATABASE TABLE COLUMNS

[75] Inventors: Shih-Gong Li; Theodore J. L. Shrader, both of Austin, Tex.

[73] Assignee: International Business Machines Corporation, Armonk, N.Y.

[21] Appl. No.: 424,764

[22] Filed: Apr. 19, 1995

Related U.S. Application Data

[63] Continuation of Ser. No. 848,496, Mar. 9, 1992, abandoned.

[51] Int. Cl.⁶ .................................................. G06F 17/30
[52] U.S. Cl. .......................... 395/148; 395/155; 395/600
[58] Field of Search .................................. 395/600, 148, 395/155, 157, 700, 161; 364/263.4

[56] References Cited

U.S. PATENT DOCUMENTS

| | | | |
|---|---|---|---|
| 5,201,046 | 4/1993 | Goldberg et al. | 395/600 |
| 5,241,648 | 8/1993 | Cheng et al. | 395/600 |
| 5,303,379 | 4/1994 | Khoyi et al. | 395/700 |

FOREIGN PATENT DOCUMENTS

| | | |
|---|---|---|
| 0079465 | 5/1983 | European Pat. Off. . |
| 0187373 | 7/1986 | European Pat. Off. . |
| 0287858 | 10/1988 | European Pat. Off. . |
| 0286110 | 10/1988 | European Pat. Off. . |
| 0314279 | 5/1989 | European Pat. Off. . |
| 0449438 | 10/1991 | European Pat. Off. . |

OTHER PUBLICATIONS

IBM Technical Disclosure Bulletin, vol. 34, No. 2, Jul. 1991, pp. 141–142 Specification and Deletion of Database Table Foreign Keys.

DeMaria et al; *Working with dBase Mac*; 1988; pp. 16–17, 115–118, 408–409.

Borland International, Paradox Relational Database Version 3.5, Immediate Database Power, User's Guide 1985, 1990.

IBM Operating System/2™ Extended Edition Version 1.3, Database Manager Structured Query Language (SQL) Concepts, Sep. 1990.

*Primary Examiner*—Heather R. Herndon
*Assistant Examiner*—Joseph H. Field
*Attorney, Agent, or Firm*—Casimer K. Salys

[57] ABSTRACT

A user interface for creating or changing the structure of a relational database having multiple tables linked by keys and arranged by indices. In one form, the invention contemplates the juxtaposed depiction on a computer video display of a matrix defining the structure of a table with one or more matrices defining the linking relationships between selected columns from that and related tables. Selection and movement through the data structure is accomplished by mouse actuated cursor. Referential integrity among the database tables is maintained through the use of primary and foreign keys. The relationships of the keys and indices to the columns of the tables are clearly represented in matrix format windows which appear concurrently with table column property information.

6 Claims, 11 Drawing Sheets

Foreign Key List:
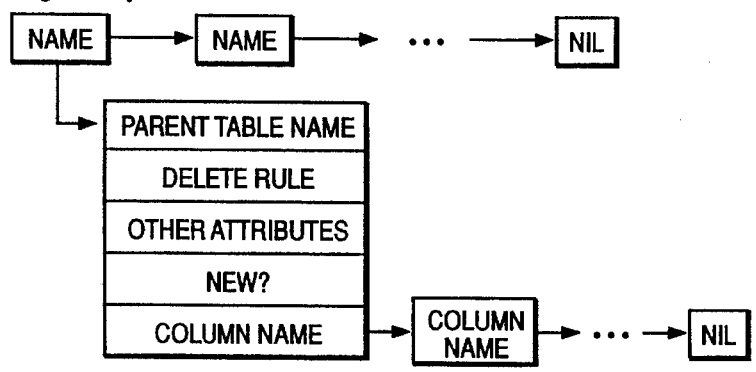
Primary Key List:
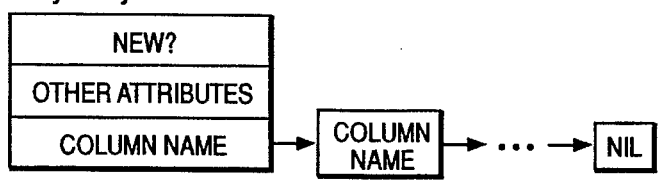
Index List:
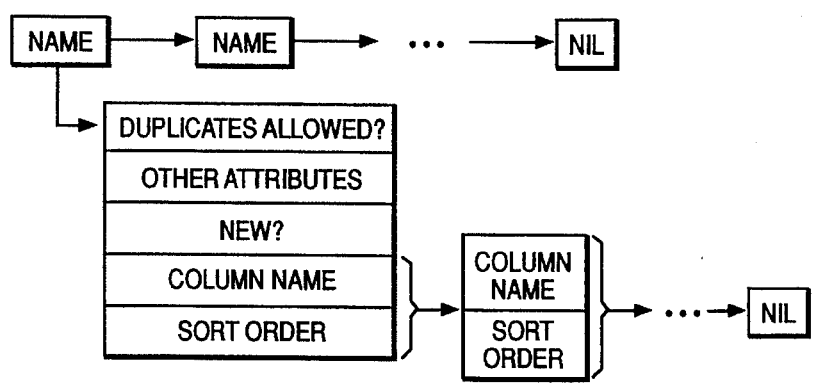
Table Column List:
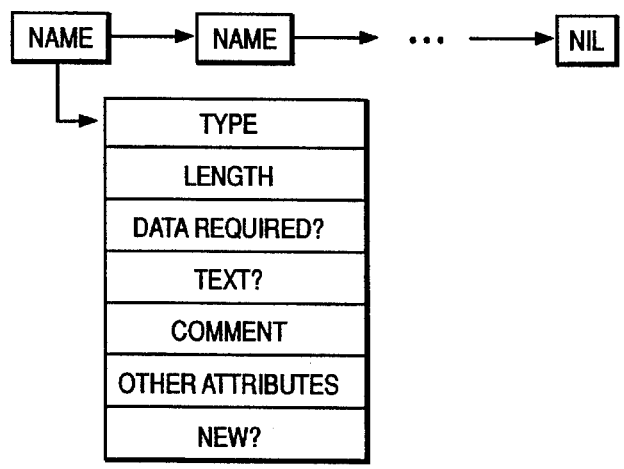
FIG. 2
DATA STRUCTURES

PRIMARY KEY
DEFINITION WINDOW

FOREIGN KEY
DEFINITION WINDOW

INDEX
DEFINITION WINDOW

FOREIGN KEY
LIST WINDOW (INDEX LIST WINDOW
IS SIMILAR)

FIG. 7

| Table | DEPARTMENT | |
|---|---|---|
| DEPTNO | DEPTNAME | MGRNO |
| A00 | Spiffy Computer Service Division | 000010 |
| B01 | Planning | 000020 |
| C01 | Information Center | 000030 |
| D11 | Manufacturing Systems | 000060 |

| Table | EMPLOYEE | | | |
|---|---|---|---|---|
| EMPNO | FIRSTNME | LASTNAME | WRKDEPT | PHONE |
| 000010 | Christine | Haas | A00 | 3978 |
| 000030 | Sally | Kwan | C01 | 4738 |
| 000060 | Irving | Stern | D11 | 6423 |
| 000120 | Sean | O'Connell | A00 | 2167 |
| 000140 | Heather | Nicholis | C01 | 1793 |
| 000170 | Masatoshi | Yoshimura | D11 | 2890 |

Figure 8:
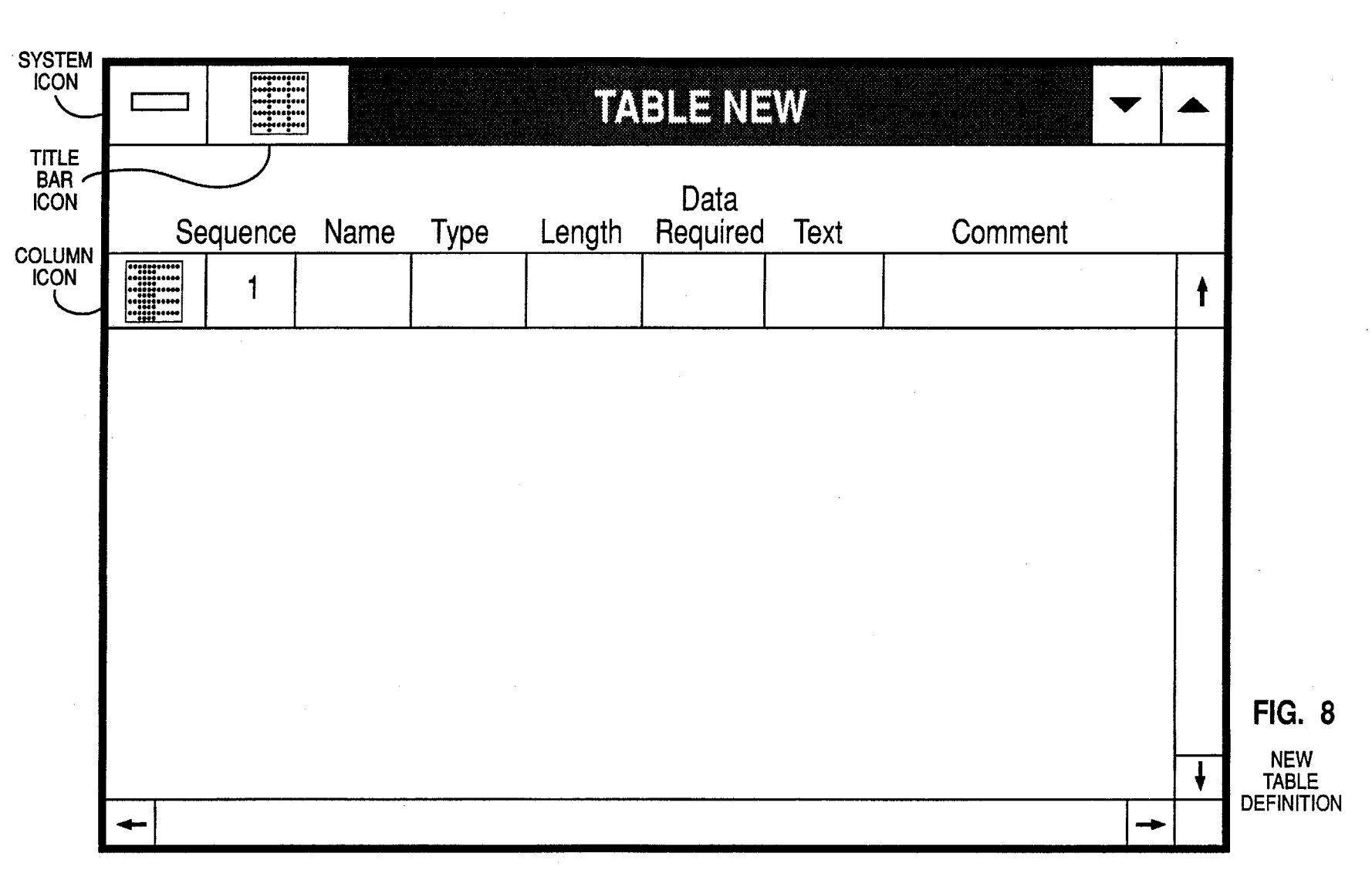

FIG. 8 NEW TABLE DEFINITION

TABLE NEW

| Sequence | Name | Type | Length | Data Required | Text | Comment |
|----------|------|------|--------|---------------|------|---------|
| 1 | | | | | | |

SYSTEM ICON

TITLE BAR ICON

COLUMN ICON

FIG. 9 COLUMN DEFINITION MATRIX

| | TABLE DEPARTMENT | | | | | |
|---|---|---|---|---|---|---|
| Seq | Name | Type | Data Length | Required | Text | Comment |
| 1 | DEPT NO | CHAR | 3 | Y | Y | Department number (primary key) |
| 2 | DEPT NAME | CHAR | 50 | Y | Y | Department name |
| 3 | MGR NO | INT | | Y | | Manager employee number |

FIG. 10
INDEX DEFINITION

TABS — Index | Primary | Foreign | Properties

Name: Department
Duplicates allowed: ○ YES ● NO

| Column Name | Order |
|---|---|
| DEPT NO | Ascending |

TABLE DEPARTMENT

| Seq | Name | Type | Length | Data Required | Text |
|---|---|---|---|---|---|
| 1 | DEPT NO | CHAR | 3 | Y | Y |
| 2 | DEPT NAME | CHAR | 50 | Y | Y |
| 3 | MGR NO | INT | | Y | |

FIG. 11
PRIMARY KEY DEFINITION

| Index | Primary | Foreign | Properties |

PRIMARY KEY

| | DEPT NO | | |
|---|---|---|---|
| | 1 | | |
| | | | |

TABLE DEPARTMENT

| Seq | Name | Type | Length | Data Required | Text | D | D | M |
|---|---|---|---|---|---|---|---|---|
| 1 | DEPT NO | CHAR | 3 | Y | Y | Y | | |
| 2 | DEPT NAME | CHAR | 50 | Y | Y | Y | | |
| 3 | MGR NO | INT | | Y | Y | | | |

FIG. 12 FOREIGN KEY DEFINITION

TABLE EMPLOYEE

| Seq | Name | Type | Length | Re-quired | Data Text | Co... |
|-----|------|------|--------|-----------|-----------|-------|
| 1 | EMP NO | INT | 6 | Y | Y | 3 |
| 2 | FIRST NAME | CHAR | 16 | Y | Y | 3 |
| 3 | LAST NAME | CHAR | 16 | Y | Y | 3 |
| 4 | WRK DEPT | CHAR | 3 | Y | Y | D |
| 5 | PHONE | INT | 4 | | | 3 |

Tabs: Index | Primary | Foreign | Properties

FOREIGN KEY

Name
Delete Rule — DEPT → RESTRICT → DEPARTMENT
Parent Table

| WRK DEPT | DEPTNO | CHAR(3) |
|----------|--------|---------|
| | | |
| | | |

GRAPHICAL USER INTERFACE FOR RELATING KEY INDEX PROPERTIES TO DATABASE TABLE COLUMNS

This is a continuation of application Ser. No. 07/848,496 filed Mar. 9, 1992 abandoned.

BACKGROUND OF THE INVENTION

The present invention relates to a user interface, and a method for exercising a user interface, in the context of a data processing system. More particularly, the invention is directed to a user interface and method by which a human user can define and use graphical depictions to link information in a relational database system.

Computer implemented relational databases abound. One example is the Extended Services for Operating System/2 (OS/2) program available from IBM Corporation. Another is the Paradox program available from Borland International. These are but two of numerous relational databases which provide users with tremendous data storage and retrieval potential, but have proven to be quite challenging to learn and efficiently utilize by novices to database technology. The need for friendlier user interfaces is becoming particularly acute given the expanded availability of computerized database systems, the greater number of users of such systems, and the reduced relative experience of such users.

A particularly complex aspect of database organization relates to the creation and use of keys, and particularly the linking of keys between multiple tables to ensure referential integrity. Referential integrity helps enforce data integrity within the database system by setting constraints on the database table values, such that all references from one table to another are valid and accurate. Though the individual formats and functions of relational database primary keys and foreign keys (sometimes referred to as secondary keys) are described in user manuals, the actual relationships which they create within the tables are difficult to visualize in the manner that such keys are routinely used. For example, if a database has two tables of diverse information and uses telephone numbers in each of the tables to identify distinct rows in the tables, and the tables are related by such telephone numbers as a key, referential integrity ensures that the data in one table is not contaminated or destroyed by a change in the other table. Consistency is ensured by linking the tables.

Although the concepts of primary keys, foreign keys, and table indexes have existed for a long time in relational database technology, their efficient creation in a database which provides referential integrity can often be challenging. In general, the primary key is composed of one or more non-null columns which uniquely identify each row in a table. In the context of our earlier example, a column of telephone numbers could serve as a primary key to identify related addresses until such time that the table extended into different area codes. Under such circumstances, the primary key would have to include both the area code column and the local telephone number column. The column or columns defining a foreign key reference a primary key. In the typical situation where the foreign key is in a different table than the primary key, the table possessing the primary key is referred to as the parent table. The value of each foreign key, in our example the combination of area code and local telephone number columns, must match one of the combined values in the associated primary key in the parent table. Thus, a table can have only one primary key, which itself can be composed of multiple columns, but can have a multiplicity of foreign keys related thereto.

Creating primary keys, foreign keys and indexes related thereto, is not only challenging but prone to error when accomplished in the context of present user interfaces for defining tables. The conventional practice of defining tables with keys involves the use of text descriptions. For example, according to the practice in the aforementioned IBM Extended Services for OS/2 Database Manager program, primary keys and foreign keys are defined by specific text statements to that effect. Other commonly used practices, an example being the earlier noted Borland International Paradox program, mandates the placement of asterisks or other symbols adjacent descriptors of the columns during the definition of the table primary keys, and applies the concept of linking through borrowed columns to relate columns in other tables. In either case, the names and properties of the columns which make up the table are specified in text listings of columns and their related properties. Thus, each table is treated separately and has its column names and properties defined by parallel adjacent lists, with table-to-table relationships integrated by text of coded symbol representation.

The user must decipher the links during the creation or subsequent modification by selectively interpreting and conceptually relating information from each of the table representations. This approach has proven to be a significant task for a knowledgeable relational database developer, and a source of confusion and frustrations to novice users. The complexity increases exponentially as the size and number of the tables linked by key increases linearly. Therefore, there exists a need for a user interface to a relational database which provides nominally experienced users with information suitable to understand and create both keys and related indexes for one or more tables, including key arrangements which mandate referential integrity.

SUMMARY OF THE INVENTION

The specification of key and index properties for multiple tables within a relational database is accomplished through a user interface which has resources for concurrently displaying two or more matrices of table properties, has resources for generating a first matrix which shows selected columns and related properties from a first table, has resources for generating a second matrix showing key properties which may link multiple tables, and has resources for selecting the properties of the links which relate the multiple tables.

In a preferred practice of the invention, two or more matrices are depicted simultaneously in windows, or panes of a video display. Table structure and property information is presented in at least one matrix, while other matrices simultaneously present the linking relationships between tables. In one form, the linking relationships are presented simultaneously in a succession of window panes. In another form, the individualized linking relationships are selected and situated juxtaposed the table parameter listing. The properties associated with each linking matrix are presented in a form that allows selectability, as well as selected addition, deletion and amendment of properties defined therein. Thus, the user has concurrently available both. The table structure information and the table relationship information, and in a graphically depicted form amenable to user friendly manipulation. The user interface is particularly beneficial in the context of understanding foreign keys, in that the preferred implementation provides direct information regarding the affected columns, the other tables to which they relate, deletion rules, and translations of column equivalence.

These and other features of the invention will be more clearly understood and more fully appreciated upon considering the description of the preferred embodiment which follows.

BRIEF DESCRIPTION OF THE DRAWINGS

FIG. 2 schematically depicts the data structures of the user interface.

FIG. 7 provides a pair of example tables.

FIGS. 8–12 schematically illustrate uses of the example tables in FIG. 7.

DESCRIPTION OF THE PREFERRED EMBODIMENT

The functions of primary keys, foreign keys and indices in relational databases are generally understood and appreciated by those who routinely work in the relational database technology. The concept of referential integrity provided by key definitions is likewise understood and appreciated. However, the formulation of such database organizational elements has heretofore been a challenge for all but highly experienced relational database designers. The present invention provides a user interface by which a novice relational database designer can understand and create relational links between multiple tables with relative ease.

As noted previously, relational database users heretofore defined table structures by specifying column names and then associating therewith the properties of the information to be inserted in the rows of the respective columns. By coding of the property information, or by a separate text description, the table keys were also specified. As the number of tables in a database increase, and the primary and foreign key relationships of the columns from the various tables becomes more intertwined, comprehension of the constraints imposed by the keys, or lack thereof by virtue of absent keys, becomes more difficult. Thus, one specific objective of the present invention is to provide a meaningful presentation of the relational links between columns of data in one or more tables.

Figure 1:
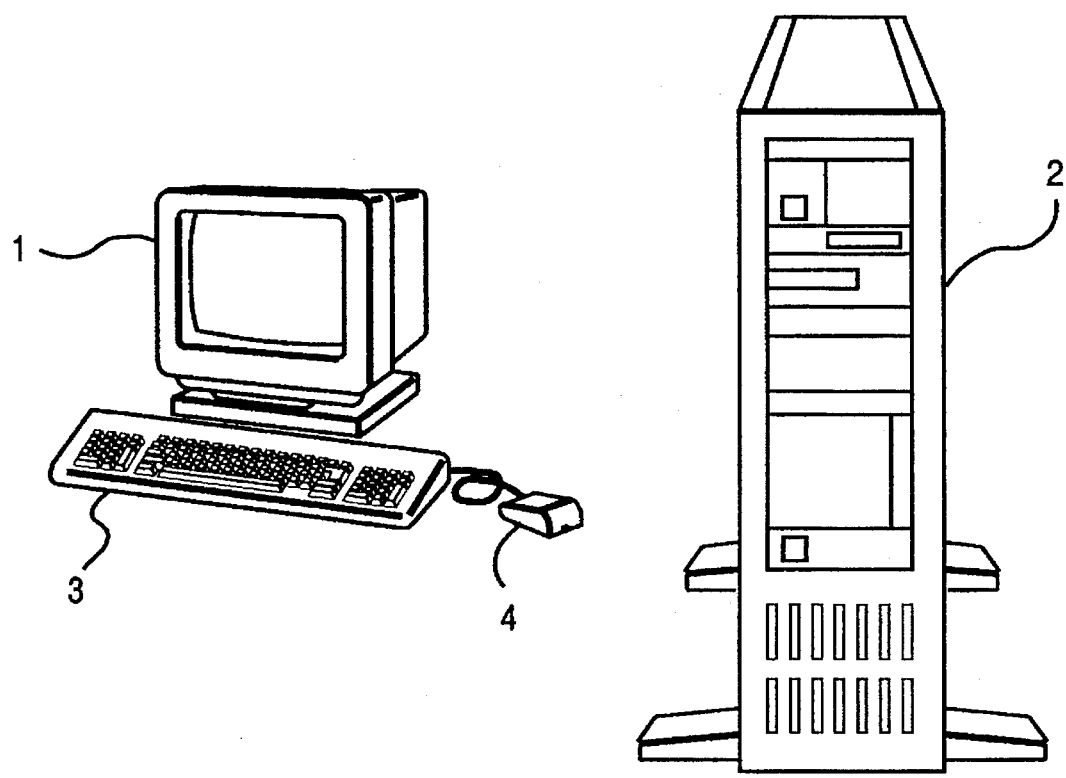
FIG. 1 schematically depicts an operating environment for the relational database.

The preferred solution involves the presentation of multiple windows on the screen of video display 1 in FIG. 1 controlled by workstation 2 in response to user commands entered through keyboard 3 or mouse 4. Workstation 2 possesses volatile as well as non volatile memory, together with digital data processing devices and electronic resources to communicate with remote databases or data storage media. Representative examples of the hardware involved are the Personal Systems/2 and RISC System/6000 product lines commercially available from IBM Corporation. Representative operating systems for the two workstations are, respectively, the OS/2 and the AIX operating systems, likewise available from IBM Corporation. In the context of such hardware and operating systems, the invention defines a user interface for the database application program.

Conventional relational database application program user interfaces fragment the table property definition procedure within each table. Thus, the column, primary key, foreign key and index properties are presented and considered independently by table. This requires the user to navigate from table to table in deciphering keys and their relationships. In contrast, the present invention provides the user with a flexible way to define table columns, primary keys, foreign keys and indexes through matrices of linking data. The creation and utilization of each aspect of the database will be considered individually in the ensuing paragraphs.

Database Table Definition

When a user specifies that a table is to be defined, or selects an existing table to be modified, the application program presents a user interface which will show the table properties on the screen of the video display. The information can be depicted on the full screen or, if preferred, can be presented in a window on the screen.

FIG. 9 illustrates a representative example of a table definition matrix as appears in the context of the example to be developed hereinafter. The characteristics which define the properties of the columns making up the table undergoing creation or modification are defined individually within the context of the matrix. Using the example in FIG. 9, the first column in the table is to be identified as the DEPTNO, is composed of three alphanumeric characters, is a required piece of information, is text information, and is defined by a comment to be part of the primary key. Successive columns are similarly entered into the matrix.

Editing of the fields within the definition matrices is accomplished by scrolling and moving the cursor to the designated field, followed by a clicking of the mouse to select the entry in a manner commonly known. As preferably implemented, double clicking with the cursor on the column icon causes the display of the column data for the column selected, making such column property data readily available for viewing by scrolling. The column property data being entered is checked for validity during the commit operation. As would be expected, changes implemented in the column structure table data are not permanently reflected in the database until a commit dialog is concluded. The invention also contemplates that the columns be amenable to rearrangement by clicking and dragging column icons. HELP information can be linked to any stage in the process.

The data structure of the lists representing the tables as described in the preceding paragraph appear in FIG. 2. As shown in the figure, associated with each name entry in Column List is a structure composed of Type information, Length information, Data Required information, etc., in direct correspondence to each column defined. The lists are repeated by Name until such time that they are blank, or a nil list is encountered, the later corresponding to a blank row at the bottom of the matrix in the table of FIG. 9. The blank line provides a location for the entry of data representing newly defined columns. Note from FIG. 2 that similar lists exist for the Index Key and Foreign Key matrices. As shown, for each Name in the Index List numerous sets of Column Name and Sort Order pairs are possible. In the case of the Foreign Key list, numerous column Names are similarly possible. As for the Primary Key list, only one exists, but it provides for a multiplicity of related Column Names.

Figure 3:
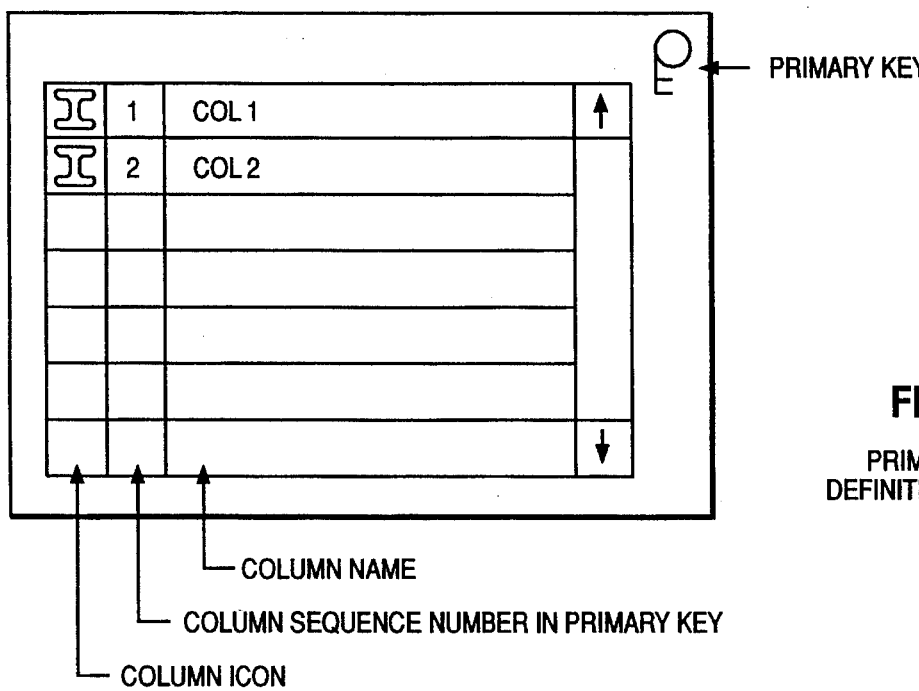
FIGS. 3–6 schematically depict the style of the various matrix pairs in table format.
Figure 4:
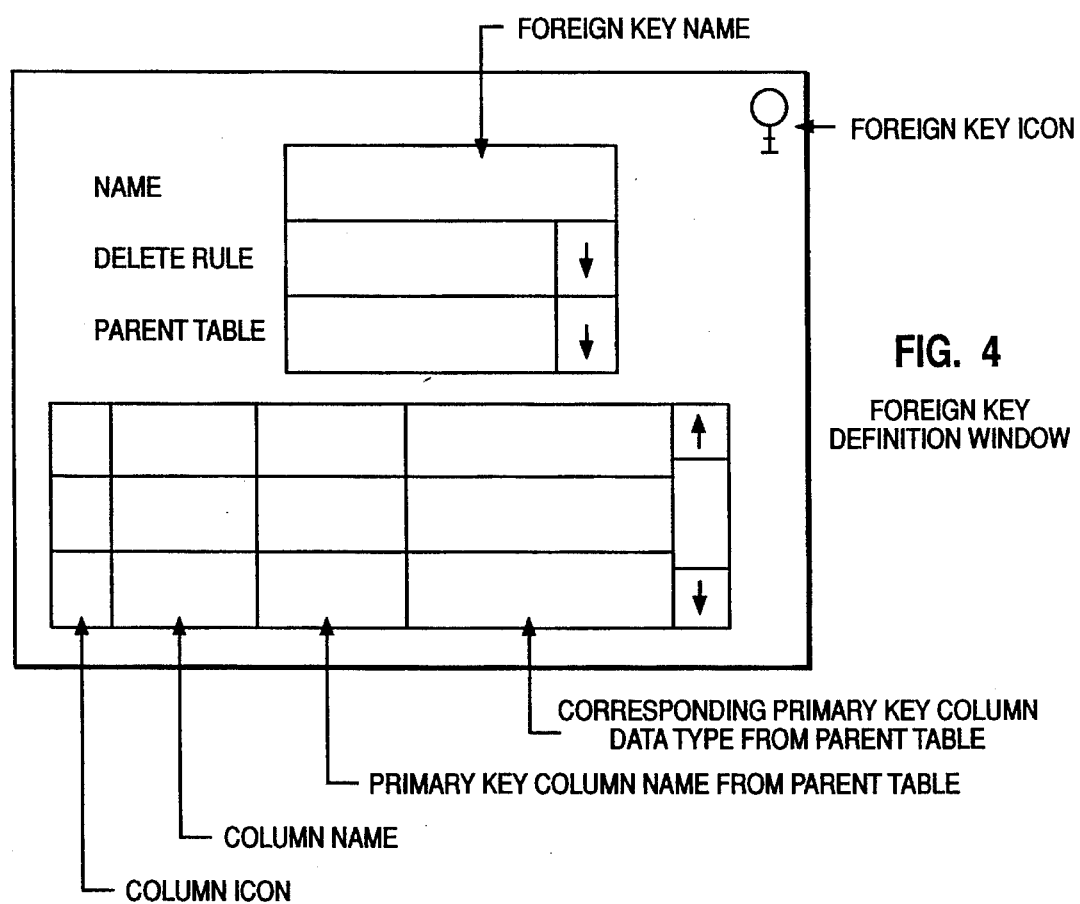
Figure 5:
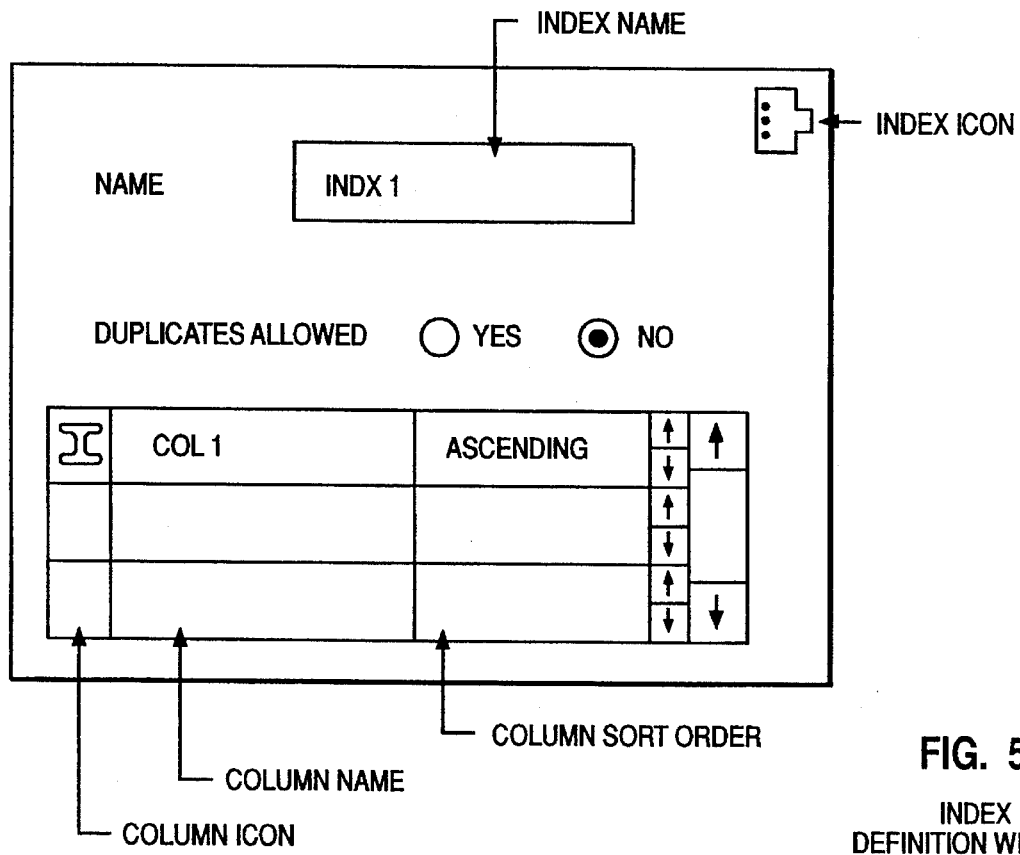

User interfaces implementing matrices defined by the data structures in FIG. 2 appear in the succession of FIGS. 3, 4 and 5 for defining the respective information in the primary key, foreign key and index definition windows, as would appear on a video display. The multiplicity of column names associated with each foreign key name appear in the user interface table of FIG. 4, while the corresponding multiplicity of column names for the index list would appear in comparable table of data in pairs. Note the direct relationship between the data structures and contents of the windows.

Figure 6:
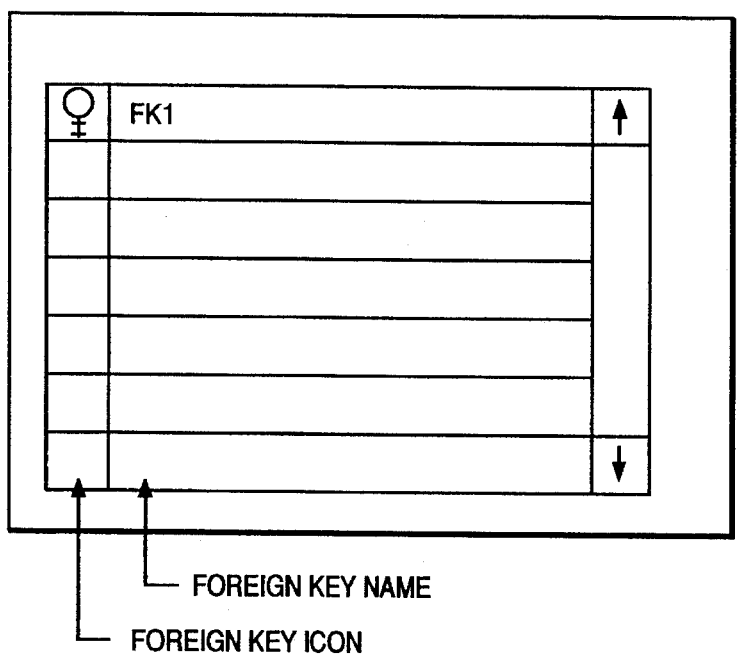

A preferred set of general operational features for working within a set of windows analogous to FIGS. 4–6 are set forth in the ensuing paragraph to confirm the ease and flexibility of the user interface. As an operation, double clicking with the cursor on a column icon always brings up the full definition of the column in a dialog box or similar presentation structure. A change to a column, such as data type, will be reflected through all instances of the column within the table. A similar situation exists for the key icons, whereby double clicking on the corresponding primary or foreign key icon pulls up the related definition window. All matrix lists have a blank line at the bottom for new entries, unless the maximum size of the capacity of the definition table has been reached the database implementation sets the capacity of each database table object definition, such as the number of columns allowed in a primary key. As each line of information is entered, a Commit occurs when specifically commanded, with error locations highlighted. A change in a column sequence number (see FIGS. 8 and 9), results in a rearrangement of the rows to reflect the newly defined sequence in the database table. Columns can be copied from table to table by dragging on an icon and dropping it thereafter in a new location. And finally, deletions of columns, keys or indexes could be made to require confirmation before commitment.

Primary Key Definition

FIG. 3 schematically illustrates the content of a primary key definition window according to a preferred practice of the present invention. In keeping with the data structure in FIG. 2, the window in FIG. 3 is composed of a primary key icon and a matrix having column icons, column sequence numbers in the primary key definition, and column names.

The columns can be entered by typing or by dragging and dropping from the column matrix or from a list containing column icons. If an invalid column is dragged into the list, the icon turns into a "not" symbol, showing that the column cannot be placed in the list of this window. There are two instances where this can occur. First, the column may not have the data required, for example if the column allows inappropriately located null values. Secondly, the column could be a duplicate of one that already exists in the primary key. Other database table definition constraints may also apply. Since the order of the columns is important, the order of the columns can be rearranged by changing the number or dragging a column to another position in the list. As completely new columns are entered, the sequence number is increased by one.

The primary key icon located in the upper right corner of the primary key definition window is selectable by cursor and mouse if the window has columns defined in the matrix. Upon being selected, the primary key icon can be dragged and dropped into the primary key window of another table, to define a new primary key for the target table (definition is copied). The key can also be dragged to a foreign key definition window, to define the parent table and thus the parent primary key columns for the foreign key. Lastly, the primary key icon can be dragged and dropped on an icon representing the delete operation if so desired.

Foreign Key Definition

An arrangement of the foreign key definition window appears in FIG. 4. The information in the foreign key definition window includes the name of the foreign key, delete rule and parent table information, and a foreign key icon. The linking information in the foreign key definition window appears in matrix form, including column icons, column names, columns for the parent table's primary key, and their corresponding column data type information.

The foreign key definition window is used to create new foreign keys or to modify existing ones. When the user enters this window, the foreign key name will already be present. New foreign keys are given a name in the foreign key list window before the user can get to the foreign key definition pane. Though the name can be changed, the only way to delete a key is to delete the icon, in a manner to be described hereafter with reference to the foreign key list window, or by blanking out all the entries in the foreign key definition window. According to a preferred practice of the invention, the delete rules pull-down list, and include as representative examples restrict, delete, cascade deletes, and set to null rules. The parent table field in the window of FIG. 4 allows the user to fill in a blank field or to select from a pull-down selection list of all available tables in the connected database. The parent table field also allows resources for the selection of a table by dragging and dropping of a table icon.

The column matrix at the bottom of the window accepts inputs when a valid table is identified in the parent table field. The foreign key is further defined using column icons or column from the current table names. This arrangement of the foreign key window allows the user to select different parent tables and dynamically view the primary keys defined for the respective tables. Double clicking on the parent table icon will open the definition of the table.

The invention provides that if a column with a data type that does not match the corresponding column in the parent table's primary key definition, or a duplicate column, is dragged over and dropped onto a row, the icon will change to a "not" symbol to show an erroneous condition.

The structure of the foreign key list matrix appears in the window depiction of FIG. 6. The contents of the matrix includes foreign key icons and corresponding foreign key names, including a conventional scrolling control mechanism for viewing a list of extended content. The foreign key list window provides a comprehensive list of all foreign keys for the table under consideration. Double clicking on a foreign key icon calls up the corresponding foreign key definition window, such as that depicted in FIG. 4, where the user can modify or delete an existing foreign key or add a new key definition. To add a foreign key in the context of the foreign key list window in FIG. 6, one merely types the name and a foreign key icon will be created by the system, then double clicks on the foreign key icon to access the foreign key definition window for further entry of information. Removing a foreign key is accomplished by selecting the icon and initiating a delete function, or by dragging the icon to a delete icon.

An alternative, abbreviated discussion of creating and relating pages of a foreign key definition information to pages of foreign key list information appears in an article entitled "Specification and Deletion of Database Table Foreign Keys" published in the IBM Technical Bulletin, Vol. 34, No. 2, July 1991, Pages 141 and 142.

Index Definition

FIG. 5, schematically illustrates the content of an index definition window according to preferred practice of the invention. The window provides a field for the entry of the index name, an index icon and a duplication control mechanism. The substantive information in the window is set forth in the matrix, including columns for the entry of column icons, column name information and column sort order information. The dragging of icons from other tables for insertion into the index information window is permitted if the column exists in the table to which the index relates. The default order of the index is ascending, which can be reversed by clicking in the appropriate up-down arrows associated with each column.

The index list window associated with the index definition window in FIG. 5 is not specifically depicted, in that it is similar to the foreign key list window of FIG. 6. This window differs only in that the icon is the index icon and the name is the index name.

A specific example of a practice of the present invention appears in succession of schematic representations in FIGS. 7–12. FIG. 7 contains the two tables of data which is to be organized. The first table is identified as DEPARTMENT, while the second table is titled as EMPLOYEE. Note in particular that the data in column DEPTNO of the DEPARTMENT table is identical to the data in the column identified as WRKDEPT of the EMPLOYEE table.

A new table is defined using the screen presentation as appears in FIG. 8. This presentation can extend over the whole screen or can reside within a window on the screen. The nature of the information to be inserted into each of the columns is identified by headings at the top of each column. The table name is entered by typing into the field identified as NEW. The properties of each column within the database table are defined line by line, where the example in FIG. 9 shows data from the example tables following the definition of the third column, MGRNO. To proceed to the next stage, the title bar icon, identified in FIG. 8, is selected. In the context of our example, the user selects the "index" from the action list provided by the title bar icon. The outcome appears in FIG. 10. Note in particular that the work area for defining index properties is windowed into a side by side arrangement with the table to which it pertains. Note that the matrix defining the structure of the table columns is visually linked by juxtaposition to the matrix serving to define the index characteristics. The column upon which the index will be based is selected by placing the cursor on the column icon for the column known as DEPTNO and dragging that icon to the index window. The "duplicates not allowed" selection is also shown to have been made in the example index definition window.

Selection of other options from within the window at the right is accomplished by positioning the mouse controlled cursor over the appropriate tab, whether it be the primary key tab, the foreign key tab or the other properties tab. The selection of a tab changes the image in the right window in a manner analogous to flipping a notebook. It should be noted that the fundamental concept of electronically enabled book tabs is already known within the industry. In the present embodiment, the book tabs merely serve as a convenient medium for simplifying the selection process. Action bar selections are also feasible.

Continuing in the context of the example, when the primary key tab is selected, the right window presents the image depicted in FIG. 11. At this stage, the table matrix in the window at the left is situation juxtaposed the primary key matrix to be defined in the window at the right. Selection of DEPTNO as primary key is accomplished by clicking by mouse actuation on the corresponding icon from the matrix on the left and then dragging the icon into the first row of the notebook matrix of the primary key window. A preferred implementation of the invention also contemplates that the user have immediate access back to the full contents of the base matrix of the table being manipulated. This is accomplished by selecting the column icon from the matrix on the left and double clicking with the mouse. Thereupon, a dialog window is created with the full content of the row selected thereby. An example of this has not been specifically shown in the drawings given that it is readily understandable.

Continuing on with the example, presume that the EMPLOYEE table is to be defined next. Again, a new table template analogous to FIG. 8 is selected and given the table title EMPLOYEE. Column property data is then entered one column at a time, noting that at this stage a dialog window at the right still does not exist. Following the procedures established during the creating of the table DEPARTMENT, the index entry is selected from the action list of the title bar icon to define an index and make the index definition pane appear. The index dialog window is created and used to specify the EMPNO column as the index. As was true of the other table, the dialog window for the index of the table EMPLOYEE includes the entry of the table name and selection of whether or not duplicates will be allowed. For this example duplicates were not allowed and the ascending order selected for the index column EMPNO.

Next, for the table EMPLOYEE, the primary key tab is selected on the notebook control. The column icon for EMPNO is then pulled into the dialog window of the primary key and placed in the first row of the matrix.

Creation of a structure to establish referential integrity follows. To accomplish this, the foreign key tab on the notebook control is selected and thereupon defines the foreign key dialog window depicted in FIG. 12 for the table EMPLOYEE. The foreign key relationship between the two tables is created in the context of the foreign key dialog window. In the example of FIG. 12, the foreign key is given the name DEPT, a deletion restriction is imposed, and the parent table, DEPARTMENT, is identified. Once the parent table named DEPARTMENT is entered, the third and fourth columns in the matrix of the dialog window are filled in with the name and type of the column in the primary key of the parent table. The corresponding column from the table EMPLOYEE, WRKDEPT, is dragged in conventional manner from the table property matrix at the left for insertion into the second column of the dialog window matrix. Since the columns WRKDEPT and DEPTNO match in data properties and content, the foreign key will be accepted as valid upon commitment.

The properties tab as appears in the dialog window at the right of FIG. 12 allows the user to selectively view "read only" attributes from the tables and similar fields. Examples of such include the table creator's ID and time stamps. Read/write fields may also be included to insert comments.

The index icon adjacent the indexed tab in FIG. 10, as well as the key icon in FIG. 11 are selectable by mouse actuation to link into the foreign key and index list windows (not shown in this example but corresponding to FIG. 6).

Figure 13:
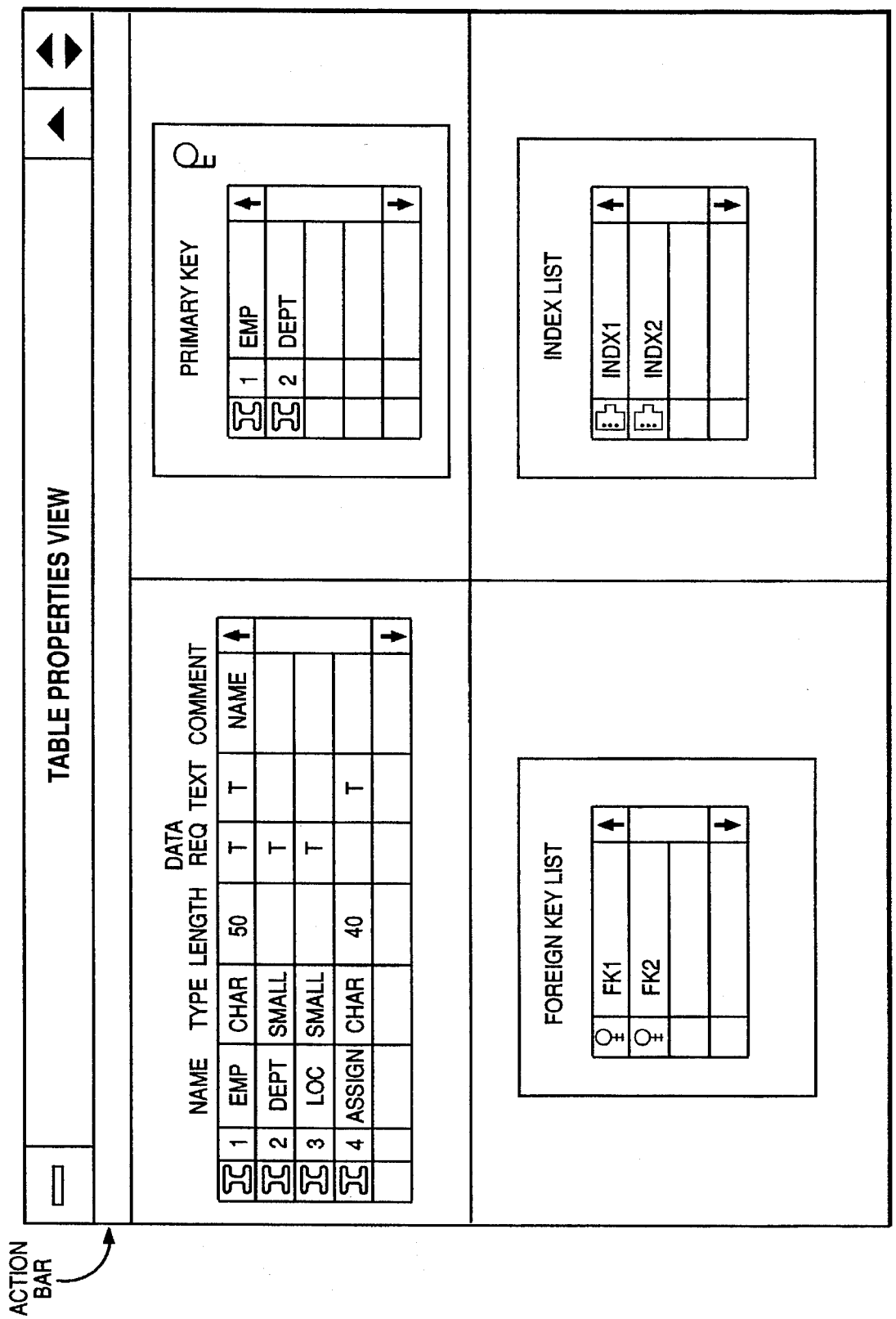
FIG. 13 schematically illustrates an alternate embodiment, in which embodiment the table structure and linking matrices are depicted simultaneously.

An alternate embodiment of the invention is depicted in FIG. 13. Whereas the example situated the table column definition matrix in a side-by-side arrangement with the notebook tabs for the index, key and property dialog windows, FIG. 13 depicts all four simultaneously in a set of four windows on the display. This embodiment eliminates the need for tabs.

Pseudocode, from which source code, can be derived, for practicing the invention appears in the ensuing pages. The functions ascribed to each grouping of pseudocode is defined by headings, thus negating a need for individualized description.

The structure of the data is as follows:

(1) Column_attribute_definition: The attribute values of a column are stored in a structure which includes the following attributes:

(a) Column Name
(b) Column Type
(c) Column Length
(d) Data Required
(e) Text
(f) Comment (2) Table_column_address: An array of pointers that each pointer points to the address of the structure described in (1) above. Via this array, the column definitions of a particular table can be accessed. The index of this array matches with the column number for each column in the table. The index starts from 1.

(3) Display_index: An array of index values that each value points to an index of the Table_column_address. The sequence of this Display_index matches the sequence number of this matrix display.

4) Selected_columns: A list of indexes to the columns that were selected via single or multiple selection.

(5) Committed_columns: A list of indexes to the columns that were committed and unalterable.

(6) New_row: It is a screen position indicating the entry for a new row definition of the matrix.

The pseudocode is as follows:

```
/*******************************/
/* Double Click on a column icon */
/*******************************/

A column icon is double clicked
   5   Determine the index D_IND of this clicked column
       IND = Display_index[D_IND]
       ADRS = Table_column_address[IND]
       Get attribute values from address ADRS
       Display the dialog box to show the column attribute
  10   values without any truncation
       Return /****************************/
/* DELETE function invoked   */
  15 /****************************/

DELETE function invoked by pressing DELETE key
             or selecting Delete action in the action bar
       Do While Selected_columns is not empty
  20         Get the first IND from Selected_columns
             If   IND in Committed_columns
                  Display a dialog box to indicate this column
                  cannot be deleted
                  /* the user can chooses to turn off this  */
  25             /* option in the configuration file        */
             Else
                  Display a dialog box to confirm this deletion
                  /* the user can chooses to turn off this  */
                  /* option in the configuration file        */
  30             Process the DELETE dialog box action
             EndIf
             Selected_columns = Selected_columns - [IND]
                  /* Removing IND from the list              */
       EndDo
  35   Return
```

The invention defined herein provides a user interface with related method and programs by which a moderately trained individual can create or modify the structure which links multiple tables of a relational database. Information from and relating to the tables in the database is selectively partitioned and visually disposed in a side-by-side arrangement for concurrent consideration. Dialog mechanisms are provided by which table properties in the various matrices can be added, deleted or modified follow an ordered and logical sequence to simplify the concepts of primary and foreign keys.

Though the invention has been described and illustrated by way of specific embodiments, the systems, methods and programs encompassed by the invention should be interpreted consistent with the breath of the claims set forth hereinafter.

We claim:

1. A user interface for defining the structure of a relational database in a computer system, comprising:

means for generating and displaying a first matrix which shows columns from a first table of the relational database;

means for generating and displaying a second matrix which shows columns from a second table of the relational database;

means for generating and displaying, in concurrence with the display of the first matrix, a primary key matrix showing columns from the first table in an order defining a primary key;

means for generating and display a foreign key matrix of table columns from the second matrix and table columns from the primary key matrix; and means for a user of the interface to select and order table columns to define relationships in the foreign key matrix.

2. The user interface recited in claim 1, wherein the matrices are depicted in individual windows on a display.

3. A method of generating on a display of a computer system a user interface for a relational database, comprising the steps of:

generating and displaying a first matrix which shows columns from a first table of the relational database;

generating and displaying a second matrix which shows columns from a second table of the relational database;

generating and displaying, in concurrence with the display of the first matrix, a primary key matrix showing columns from the first table in an order defining a primary key;

generating and displaying a foreign key matrix of table columns from the second matrix and table columns from the primary key matrix; and selecting and ordering of table columns to define relationships in the foreign key matrix.

4. The method recited in claim 3, wherein the matrices are depicted in individual windows on the display.

5. A computer useable medium having computer readable program code for generating by a computer a user interface which defines a structure for a relational database within the computer, comprising:

means for generating and displaying a first matrix which shows columns from a first table of the relational database;

means for generating and displaying a second matrix which shows columns from a second table of the relational database;

means for generating and displaying in concurrence with the display of the first matrix, a primary key matrix showing columns from the first table in an order defining a primary key;

means for generating and displaying a foreign key matrix of table columns from the second matrix and table columns from the primary key matrix; and means for a user of the interface to select and order table columns to define relationships in the foreign key matrix.

6. The computer usable medium recited in claim 5, wherein the matrices are depicted in individual windows on a display.

* * * * *